United States Patent [15] 3,673,506
Faulkner [45] June 27, 1972

[54] ELECTRONIC PHASE SENSITIVE DETECTOR CIRCUITS

[72] Inventor: Eric Andrew Faulkner, Reading, England
[73] Assignee: Brookdeal Electronics Limited, Bracknell, England

[22] Filed: Feb. 16, 1971
[21] Appl. No.: 115,524

[30] Foreign Application Priority Data

March 11, 1970 Great Britain ......................11,589/70

[52] U.S. Cl. ................................329/103, 307/232, 329/50, 329/110
[51] Int. Cl. ..........................................................H03d 1/18
[58] Field of Search ...................329/101, 102, 103, 50, 110; 332/43 B, 24; 307/232, 233

[56] References Cited

UNITED STATES PATENTS

| | | | |
|---|---|---|---|
| 3,245,006 | 4/1966 | Runyan | 329/103 X |
| 3,241,078 | 3/1966 | Jones | 329/50 |
| 3,483,488 | 12/1969 | Crosby | 329/103 X |
| 3,519,841 | 7/1970 | Leinfelder | 307/232 |

*Primary Examiner*—Alfred L. Brody
*Attorney*—Larson, Taylor and Hinds

[57] ABSTRACT

A phase-sensitive detector circuit comprises two long-tailed pairs of transistors of complementary type connected together and switched by a reference signal so that the transistors of each pair joined to each other conduct simultaneously. The signal input is applied to a tail of one of the pairs and a feedback circuit operates to control the tail of the other pair to tend to maintain the mean voltage at a junction point between the two pairs at a constant value. A resistance is connected across the junctions between the pairs and the output is taken differentially from the junctions.

4 Claims, 1 Drawing Figure

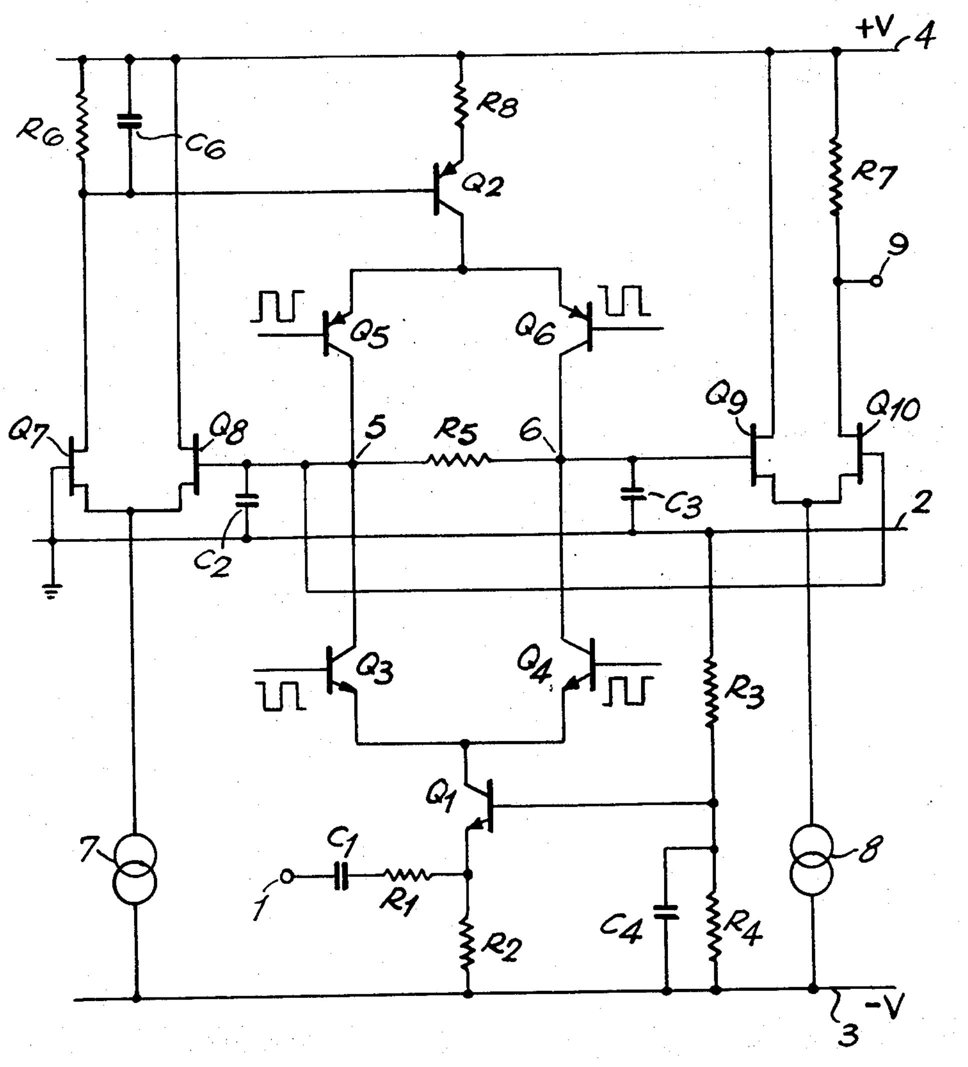
+V
4
R6
C6
R8
Q2
R7
9
Q5
Q6
Q7
Q8
5
R5
6
Q9
Q10
C3
2
C2
Q3
Q4
R3
Q1
7
C1
1
R1
R2
C4
R4
8
-V
3

ELECTRONIC PHASE SENSITIVE DETECTOR CIRCUITS

This invention relates to electronic phase-sensitive detector circuit arrangements.

Such circuits operate to switch a signal input between two output terminals under the control of a reference signal.

It is an object of the invention to provide a circuit which has a high degree of linearity, freedom from drift and a wide dynamic range.

According to the invention an electronic phase-sensitive detector circuit arrangement comprises two sections, one section comprising a first signal translation device and a load therefor consisting of two parallel paths each including current-switching means, and the other section comprising a second signal translation device and a load therefor consisting of two parallel paths each including current-switching means, means for applying reference signals to each section to cause one or other of the switching means of each section to conduct depending on the polarities of the reference signals, junctions between the paths of one section and the paths of the other section to enables those paths joined to each other through the junctions to conduct simultaneously, means for applying an input signal waveform to the first signal translation device, feedback means controlled by the mean voltage of one of the junctions for controlling the second signal translation device in a manner to tend to maintain said means voltage constant, a resistive connection between the respective junctions, and signal output means for combining the voltages of both the junctions differentially.

The current-switching means may comprise transistors, the transistors of one section being of opposite conductivity type to the transistors of the other section.

The feedback means may comprise a pair of field-effect transistors connected as a long-tailed pair and supplied from a constant current source. The gates of the field-effect transistors are connected respectively to a point of fixed reference potential and to one of the junctions, and a connection from one of the field-effect transistors to control the second signal translation device.

The output means may be a long-tailed pair of field-effect transistors the gates of which are connected to the respective junctions.

In order that the invention may be more fully understood reference will now be made to the drawing accompanying this specification the single figure of which illustrates an embodiment thereof.

Referring now to the figure there is shown therein a phase-sensitive detector circuit arrangement comprising two sections one of which has npn transistors Q1, Q3 and Q4 and the other of which sections has three pnp transistors Q2, Q5 and Q6. A signal input from a terminal 1 is applied through a capacitor C1 and resistor R1 to the emitter electrode of transistor Q1 which has an emitter resistor R2 and the base of which is connected to a potential divider chain comprising a resistor R3 connected to a line 2 connected to a point of fixed reference potential, for example to ground, and a resistor R4 connected to the negative supply line 3 and a bypass capacitor C4 is connected across resistor R4.

The collector electrode of transistor Q1 has a load comprising two parallel paths respectively including transistors Q3 and Q4. The bases of transistors Q3 and Q4 are supplied with reference signal waveforms in anti-phase so that one or other of the transistors Q3 and Q4 conduct. Thus the current flowing through transistor Q1 in accordance with the signal applied at terminal 1 will be switched between the paths in which transistors Q3 and Q4 are situated.

The pnp section consists of transistor Q2 the emitter electrode of which is connected to positive supply line 4 through a resistor R8 and two parallel paths formed by transistors Q5 and Q6 arranged so that the paths including transistors Q5 and Q3 are joined together as are the paths including transistors Q6 and Q4. A resistor R5 is connected between the junctions 5 and 6. Reference signals are applied to the bases of transistors Q5 and Q6 in anti-phase in a manner such that transistors Q5 and Q3 conduct simultaneously in one phase of the reference signal and transistors Q4 and Q6 conduct simultaneously in the other phase of the reference signal. One typical cycle of the reference waveform as applied to the switching transistors Q3, Q4, Q5 and Q6 is marked in the figure.

A feedback circuit is provided to control the current through transistor Q2 in accordance with the potential at junction 5 so as to tend to maintain the mean potential at junction 5 at approximately ground level.

The feedback circuit illustrated in the figure comprises two field-effect transistors Q7 and Q8 connected as a long-tailed pair and supplied from a constant current source 7. The gate electrode of transistor Q7 is connected to the ground line 2 while the gate electrode of transistor Q8 is connected to junction 5. Transistor Q7 has a drain load comprising a resistor R6 bypassed by a capacitor C6 and the drain electrode of transistor Q7 is also connected to the base electrode of transistor Q2.

The output from the circuit is taken from the junctions 5 and 6. This output is in differential form and if required can be combined in an output circuit comprising two field-effect transistors Q9 and Q10 connected as a long-tailed pair and supplied from a constant current source 8. The junctions 5 and 6 are connected to the respective gate electrodes of transistors Q9 and Q10 and the combined output is taken from an output terminal 9 connected to the drain electrode of transistor Q10 which has a load resistor R7.

The circuit arrangement illustrated in the figure can be modified in a number of ways. Thus instead of feeding the circuit input to the emitter electrode of transistor Q1 it can be fed to the base electrode thereof. Also instead of applying switching signals to the bases of all four of the transistors Q3, Q4, Q5 and Q6 they can be applied to the bases of two of the transistors only, for example the transistors Q3 and Q5, and the base electrodes of the other transistors Q4 and Q6 can be connected to points on potential divider chains connected between the respective supply lines and the ground. Furthermore in the figure the feedback circuit is illustrated as comprising a long-tailed pair of field-effect transistors, these being desirable in limiting the current drain at the junction 5. However any other suitable feedback circuit can be provided which fulfills a similar function. Also the input signal can be fed to transistor Q2 simultaneously with its application to transistor Q1.

I claim:

1. An electronic phase-sensitive detector circuit comprising two sections, one section comprising a first signal translation device and a load therefor consisting of two parallel paths each including current-switching means and the other section comprising a second signal translation device and a load therefor consisting of two parallel paths each including current-switching means, means for applying reference signals to each section to cause one or other of the switching means of each section to conduct depending on the polarities of the reference signals, junctions between the paths of one section and the paths of the other section to enable those paths joined to each other through the junctions conduct simultaneously, means for applying an input signal waveform to the first signal translation device, feedback means controlled by the mean voltage of one of the junctions for controlling the second signal translation device in a manner to tend to maintain said mean voltage constant, a resistive connection between the respective junctions, and signal output means for combining the voltages at both the junctions differentially.

2. The circuit as claimed in claim 1 in which the current-switching means comprise transistors and the transistors of one section are of opposite conductivity type to the transistors of the other section.

3. The circuit as claimed in claim 1 in which the feedback means comprises a pair of field-effect transistors connected as a long-tailed pair, the gates of the field-effect transistors being connected respectively to a point of fixed reference potential and to one of the junctions, and a connection from one of the field-effect transistors to control the second translation device.

4. The circuit as claimed in claim 1 in which the output means comprises a long-tailed pair of field-effect transistors the gates of which are connected to the respective junctions.

* * * * *